(No Model.) 3 Sheets—Sheet 1.

M. J. GRIER.
COMPENSATING DEVICE FOR CAR BRAKE MECHANISM.

No. 580,310. Patented Apr. 6, 1897.

WITNESSES
Chas Amon
Frank E. Bechtold

INVENTOR
Matthew J. Grier
By his Attorneys
Howson & Howson (No Model.) 3 Sheets—Sheet 2.
M. J. GRIER.
COMPENSATING DEVICE FOR CAR BRAKE MECHANISM.
No. 580,310. Patented Apr. 6, 1897.

WITNESSES
Chas. Amon
Frank E. Bechtold

INVENTOR
Matthew J. Grier
By his Attorneys
Howson & Howson (No Model.) 3 Sheets—Sheet 3.
M. J. GRIER.
COMPENSATING DEVICE FOR CAR BRAKE MECHANISM.
No. 580,310. Patented Apr. 6, 1897.

WITNESSES
INVENTOR
Matthew J Grier
By his Attorneys

UNITED STATES PATENT OFFICE.

MATTHEW J. GRIER, OF PHILADELPHIA, PENNSYLVANIA.

COMPENSATING DEVICE FOR CAR-BRAKE MECHANISM.

SPECIFICATION forming part of Letters Patent No. 580,310, dated April 6, 1897.

Application filed June 12, 1894. Serial No. 514,316. (No model.)

*To all whom it may concern:*

Be it known that I, MATTHEW J. GRIER, a citizen of the United States, residing in Philadelphia, Pennsylvania, have invented certain Improvements in Compensating Devices for Car-Brake Mechanism, of which the following is a specification.

My invention consists of certain improvements in the compensating devices for railway-car-brake mechanism constituting the subject of my Letters Patent No. 518,919, dated April 24, 1894, the object of my present invention being to embody the principles of construction shown and described and claimed in said application to four-wheel car-trucks having eight brake-shoes—that is to say, one upon each side of each wheel—and to six-wheel trucks having six shoes, one for each side of each wheel. This object I attain in the manner hereinafter set forth, reference being had to the accompanying drawings, in which—

Figure 1:
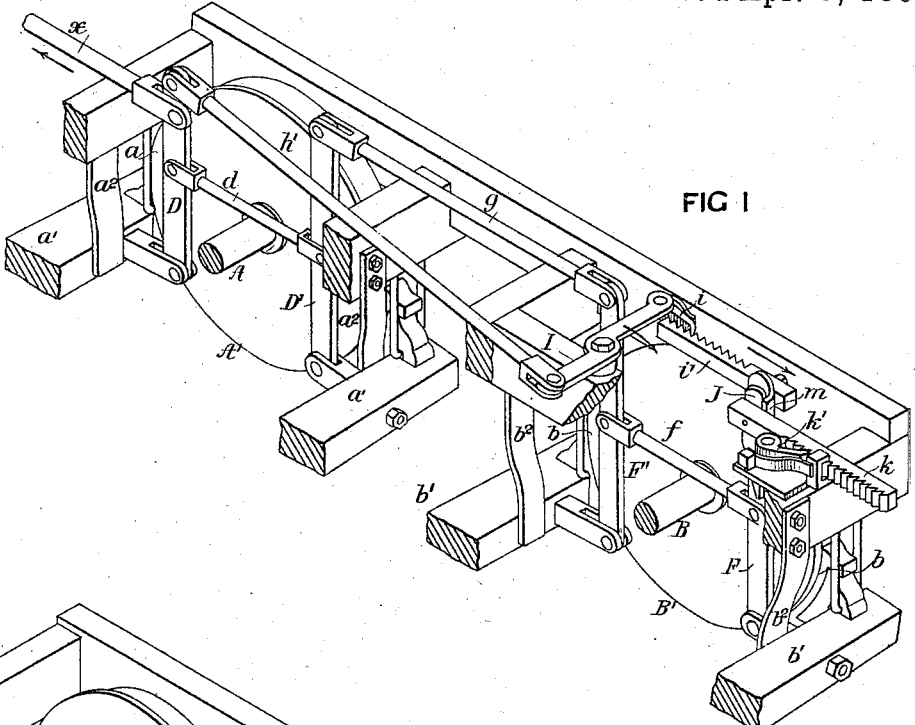
Figure 2:
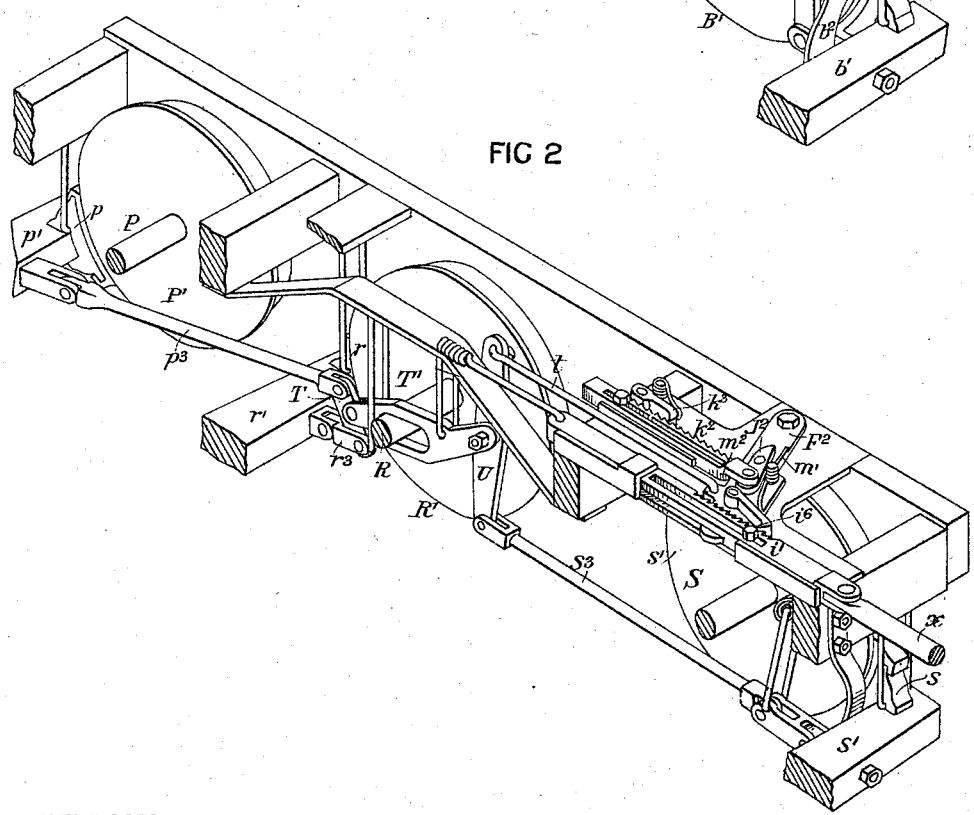
Figure 1A:
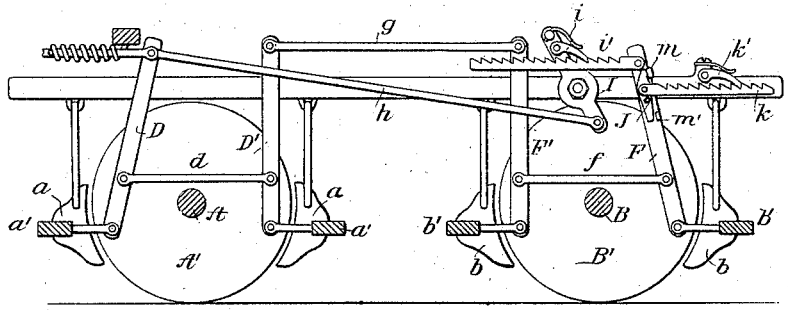
Figure 2A:
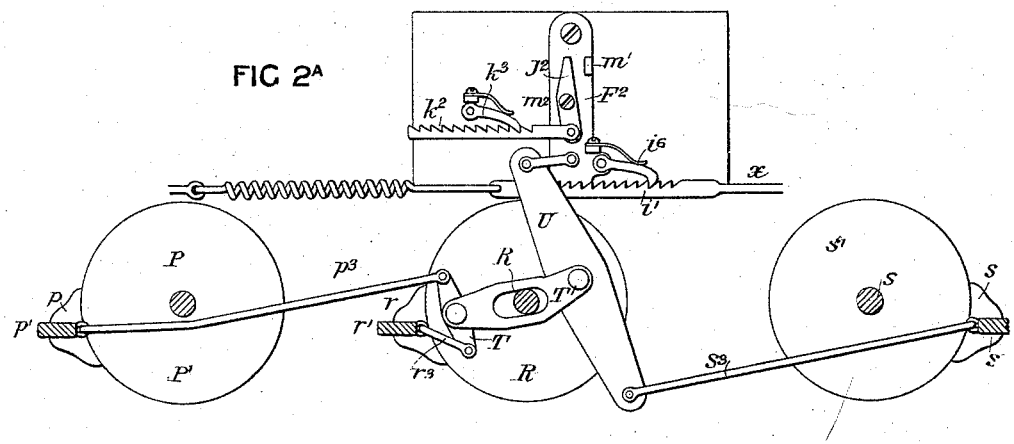
Figure 3:
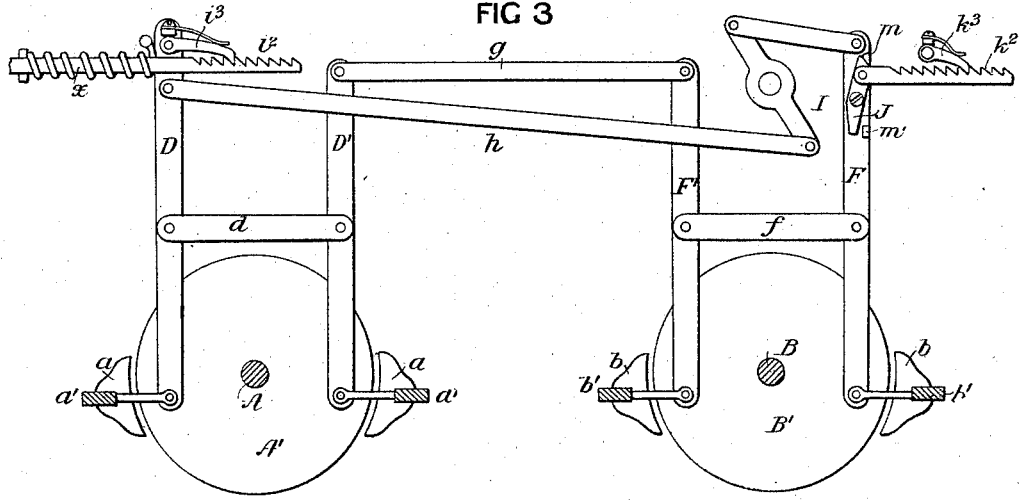
Figure 4:
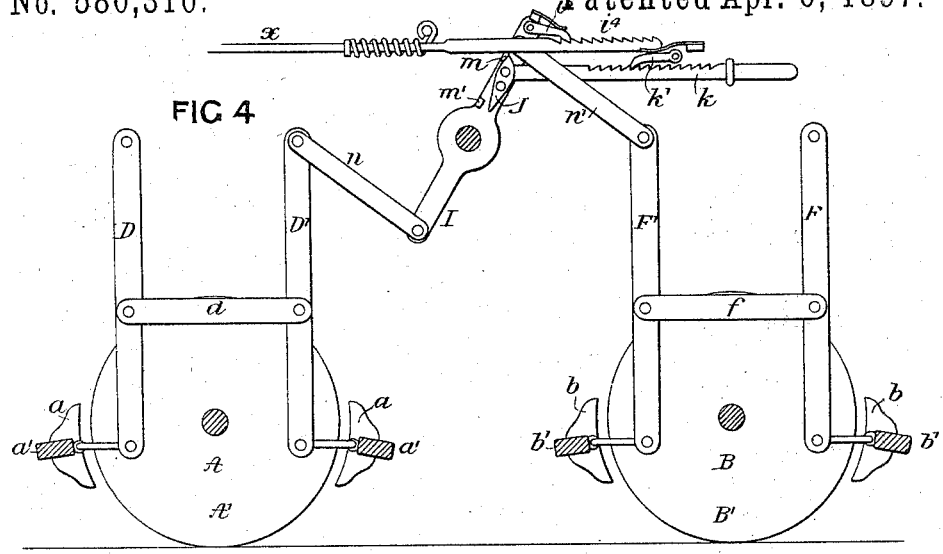
Figure 5:
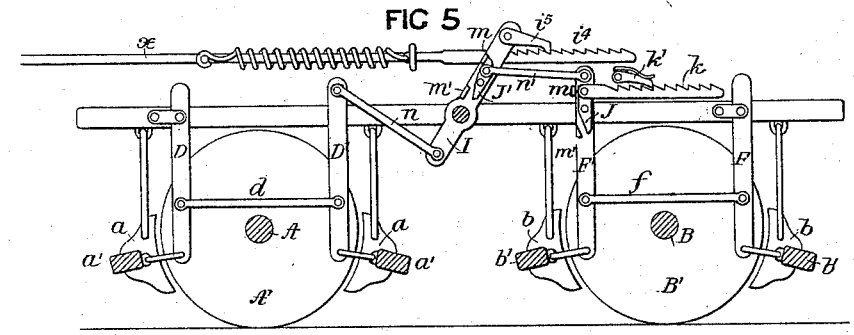
Figure 6:
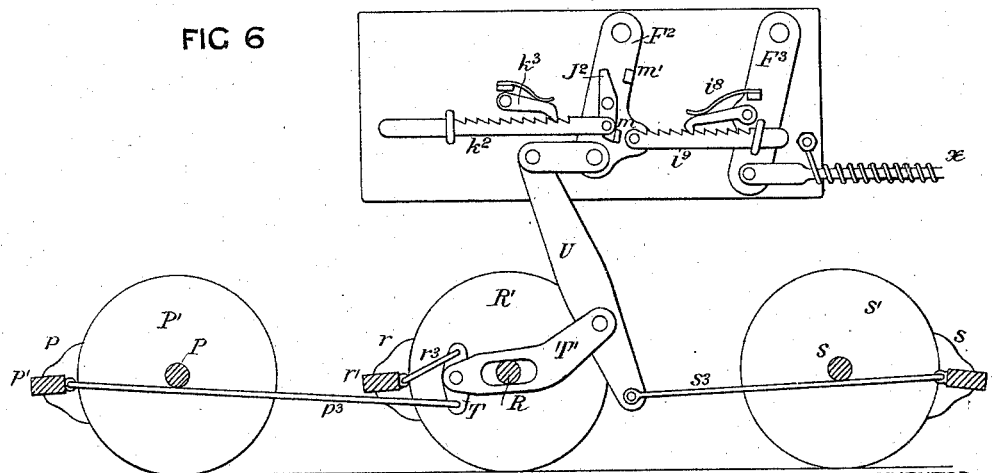

Figure 1 is a perspective diagram illustrating the application of my invention to a four-wheel truck having brake-shoes on each side of each wheel. Fig. 1ª is a diagrammatic view of the same in elevation. Fig. 2 is a perspective diagram similar to Fig. 1, but illustrating the application of my invention to a six-wheel truck having shoes upon one side of each wheel. Fig. 2ª is a diagrammatic view of the same in elevation. Figs. 3, 4, and 5 are modified forms of the compensating devices as applied to a four-wheel truck with eight shoes, and Fig. 6 is a diagram illustrating a modified form of the compensating devices as applied to six-wheel trucks having a brake-shoe for each wheel.

In Fig. 1, A and B represent the two axles of the truck, the axle A having at each end a wheel A' and the axle B a like wheel B'.

Adapted to each side of the wheel A is a brake-shoe $a$, these brake-shoes being carried by beams $a'$, suitably suspended from the frame of the truck, and, if desired, acted upon by springs $a^2$, tending to thrust the brakes away from the wheels. In like manner the wheel B' is acted upon by brake-shoes $b$, carried by brake-beams $b'$, likewise hung to the truck and acted upon by springs $b^2$.

Hung to a lug on one of the brake-beams $a'$ is a lever D, and to a lug on the other brake-beam $a'$ is hung a lever D', these levers being connected by a link $d$. In like manner a lug on one of the brake-beams $b'$ carries a lever F, and a lug on the other beam $b'$ carries a lever F', these levers being connected by a link $f$ and the upper ends of the levers D' and F' being connected by a link $g$. This is an arrangement now in use upon railway-cars, the power of the braking apparatus being applied to the upper end of one of the levers D or F, as, for instance, the lever D, and the upper end of the lever F being carried by a fulcrum fixed during the operation of the brakes, but capable of being shifted by hand when it is desired to compensate for wear of the brake-shoes or slack of the brake-gear due to other causes.

The rod $x$ of the air-brake cylinder or of the hand-brake is directly or indirectly connected to the upper end of the lever D, and said lever constitutes the only "live-lever" of the series—that is to say, the only lever to which power is directly applied—and which, after its shoe is brought into contact with the wheel, serves to transmit the power to the other levers of the series, or, as they are usually termed, "dead-levers."

In applying my automatic compensating devices to braking mechanism of this character I convert one of the usual dead-levers of the set into a live-lever and thereby increase the power of the mechanism as well as take up the slack.

One form of the invention is illustrated in Figs. 1 and 1ª, on reference to which it will be observed that the upper end of the lever D is connected by a rod $h$ to a lever I, suitably hung to the car sill or framing, this lever carrying a spring-pawl $i$, which acts upon a rack $i'$, hung to the upper end of a lever F. Pivoted to said lever F is a short lever J, to which is hung a rack $k$, engaged by a spring-pawl $k'$, the teeth of both racks $i$ and $k$ facing in the same direction.

When the brakes are off, the parts occupy the relation shown in the drawings, the upper end of the lever J bearing against a stop $m$ on the lever F. When the brake-rod $x$, however, is moved in the direction of the arrow, like movement is transmitted to the lever D, and through the medium of the rod $h$ the lever I is moved in the direction of its arrow, thereby thrusting forward the pawl $i$ and the rack $i'$, with which it engages, and consequently moving in the direction of the arrow the upper end of the lever F. The first effect of this movement is to shift the lever J until its lower end comes into contact with the stop $m'$, Fig. 1$^a$, on the lever F, owing to the fact that the lever J is pivoted to the lever F at a point between the stop $m'$ and the point of connection of the rack K. Hence the latter, being more difficult to move than is the lever J, retards the movement of the upper arm of said lever and causes its lower arm to be moved forward into contact with said stop $m'$. If by this time the brake-shoes are in contact with the wheels, no further movement of the lever F takes place, but if the slack in the braking mechanism is such that the shoes are not in contact with the wheels when the lever J has completed its movement the further movement of the upper end of the lever F will be transmitted to the rack $k$, and such movement will be held by the engagement of the pawl $k'$ with said rack, so that when the brakes are released and the rod $x$ moves in a direction the reverse of the arrow the only backward movement of the upper end of the lever F which will be permitted is that sufficient to move the lever J until its upper end comes in contact with the stop $m$. This movement will be sufficient to permit the brake-shoes to fall clear of the wheels, and the pawl $i$ will slip over the teeth of the rack $i'$ after such movement has been completed, so that on the next movement of the brake-operating device the pawl $i$ will engage with the rack $i'$ at a point nearer the end of the same, and the travel of the piston in the brake-cylinder or the movement of the brake-wheel will be correspondingly reduced.

If the amount of slack in the first instance is too great to be taken up by a single movement of the piston of the brake-cylinder, a second operation of the same will cause a still further advance of the rack $k$ and a further slipping of the pawl $i$ on the teeth of the rack $i'$, the lever F, after each take-up movement of the rack $k$, only falling back to the extent permitted by the limited extent of free movement of the lever J.

When the parts reach their normal operative position, there will on each operation of the brakes be no forward movement of the rack $k$ and no slipping of the pawl $i$ on the rack $i'$ on the backward movement, the movement of the lever F being only sufficient to cause the swinging of the lever J between its two stops.

The movement of the piston in the brake-cylinder is therefore reduced to a minimum, the movement of the brake-shoes being only sufficient to permit them to properly clear the wheels when the brakes are off, and no sliding of the pawls and racks in contact with each other being permitted until there is further wear or slackening. In the construction shown in Figs. 1 and 1$^a$ it will be observed also that both of the levers D and F are live-levers. Hence the power of the brake is increased.

In Fig. 3 I have shown a modified construction in which the brake-rod $x$ has a rack $i^2$, engaging with a spring-pawl $i^3$, carried by the upper end of the lever D, the lever I being connected directly to the upper end of the lever F, but the device being in other respects similar to that shown in Fig. 1 and its operation being also similar.

In Fig. 4 I have shown a further modification in which the levers D$'$ and F$''$ become the live-levers and the levers D and F the dead-levers. In this case one arm of the lever I is connected by a rod $n$ to the upper end of the lever D$'$, and the other arm of said lever I is connected by a rod $n'$ to the upper end of the lever F$''$, the brake-rod $x$ being provided with a rack $i^4$, acting upon a spring-pawl $i^5$ at the outer end of the lever I. In this case also the teeth of the racks $i^4$ and $k$ are reversed, the take-up movement of the rack $k$ being in the same direction as the movement of the rod $x$.

Fig. 5 illustrates a somewhat similar arrangement, in which, however, the take-up rack $k$ and its lost-motion lever J are employed in connection with the upper end of the lever F$'$, and a supplementary lost-motion lever J$'$ is employed in connection with the connecting-rod $n'$ between the levers I and F$'$.

In Figs. 2 and 2$^a$ I have shown one method of applying my invention to a six-wheel truck having a brake-shoe for each wheel. In this case the three axles are represented at P, R, and S, and the wheels at P$'$, R$'$, and S$'$, $p$, $r$, and $s$ representing the brake-shoes, and $p'$, $r'$, and $s'$ the brake-beams. The brake-beam $p'$ is connected by a rod $p^3$ to the upper end of a lever T, the lower end of which is connected by a rod $r^3$ to a bracket on the intermediate brake-beam $r'$. Intermediate of its ends the lever T is connected to one end of a link T$'$, which is slotted for the passage of the central axle R, and is connected at its opposite end to a lever U, the lower end of which is connected by a rod $s^3$ to the brake-beam $s'$, while the upper end of said lever receives the power necessary to apply the brakes, said upper end of the lever in the usual construction being connected directly to the brake-operating rod. I, however, connect the upper end of the lever U by means of a link $t$ to a compensating lever F$^2$, suitably hung to a plate carried by the sill or frame of the car, this lever also carrying a pawl $i^6$, which engages with a rack $i^7$ on the brake-rod $x$.

Suitably mounted upon the lever F$^2$ is a lost-motion lever J$^2$, which carries the retaining-rack $k^2$, the latter engaging with a spring-pawl $k^3$. On the forward movement of the brake-rod $x$, therefore, there is a like movement of the free end of the lever F$^2$ and of the upper end of the lever U, the first portion of this movement causing the lever J² to swing upon its fulcrum until its free end comes into contact with the stop $m'$, whereupon further movement of the lever F² is transmitted to the rack $k^2$, which movement is retained, as backward movement of said rack is prevented by the pawl $k^3$, the limited free movement of the lever F² permitted by the lever J² being sufficient to permit the brake-shoes to clear the wheels. In this case the backward movement of the lever F² is arrested not by contact of the lever J² with a stop $m$, but by contact of the lever F² itself with a stop $m^2$, carried by the rack $k^2$.

In the modified construction shown in Fig. 6 the brake-rod is connected to a supplementary lever F³, which carries a spring-pawl $i^8$, engaging with a rack $i^9$, hung to the compensating lever F².

In the various diagrammatic views, Figs. 1ª, 2ª, and 3 to 6, I have illustrated all of the parts as being in the same plane, for the better showing of said parts in a single view, but it will be understood that in most, if not in all, cases the compensating devices will be in a horizontal plane on the truck, as illustrated in Figs. 1 and 2, so as to occupy the least possible amount of vertical space beneath the car.

Having thus described my invention, I claim and desire to secure by Letters Patent—

1. The combination of the compensating lever, with the rack-and-pawl mechanism of the brake-operating rod, the rack-and-pawl take-up, means for retracting the brake-rod, and a lost-motion lever carrying one of said racks, the opposite arms of said lever being arrested by suitable stops, whereby after the slack is taken up, the brake-shoes are, by the movement of said lever, permitted to fall clear of the wheels, substantially as specified.

2. The combination in a four-lever car-truck, of the brake-operating rod, means for retracting the same, and a compensating lever to which the pull of the operating-rod is transmitted and which is connected to two of the levers of the series whereby both of said levers become live-levers, substantially as specified.

3. The combination in car-braking mechanism, of the compensating lever, rack-and-pawl mechanism whereby the power of the brake-rod is applied, means for retracting said brake-rod, a rack-and-pawl take-up hung to the compensating lever, a lever through the medium of which the movement of the brake-rod is transmitted to said compensating lever, and lost-motion devices carried by both the compensating lever and the transmitting-lever, substantially as specified.

In testimony whereof I have signed my name to this specification in the presence of two subscribing witnesses.

MATTHEW J. GRIER.

Witnesses:
FRANK E. BECHTOLD,
JOSEPH H. KLEIN.